United States Patent [19]

Kaiser

[11] Patent Number: 5,185,036
[45] Date of Patent: Feb. 9, 1993

[54] SOLUBLE TELLURIUM COMPOSITIONS

[75] Inventor: Herbert J. Kaiser, St. Louis, Mo.

[73] Assignee: Calgon Corporation, Pittsburgh, Pa.

[21] Appl. No.: 722,740

[22] Filed: Jun. 27, 1991

[51] Int. Cl.$^5$ .................................................. C08L 5/16
[52] U.S. Cl. .................................... 106/208; 252/363.5
[58] Field of Search ....................... 106/208; 252/363.5

[56] References Cited

U.S. PATENT DOCUMENTS 4,724,201 2/1988 Okazaki et al. ....................... 430/580

OTHER PUBLICATIONS

CA 95(2):15927t, Japan, 1980.
CA 94(12):93611d, Japan, 1980.

Primary Examiner—Theodore Morris
Assistant Examiner—David M. Brunsman
Attorney, Agent, or Firm—W. C. Mitchell; C. M. Caruso

[57] ABSTRACT

Method for solubilizing tellurium over a wide pH range which uses a cyclodextrin as the solubilizing agent, and resulting compositions containing soluble tellurium.

10 Claims, No Drawings

SOLUBLE TELLURIUM COMPOSITIONS

BACKGROUND OF THE INVENTION

The present invention relates to the solubilization of tellurium and to the use of cyclodextrins to accomplish the same, particularly in the mid-pH range. The resulting compositions are useful in many industrial applications, including, but not limited to, applying tellurium coatings to metallic surfaces.

As disclosed in copending application Ser. No. 361,087, tellurium ion sources can be used to apply tellurium-containing coatings to metallic surfaces. Unfortunately, because of solubility limitations, such processes are generally run at either high or low pH's. This is necessary because tellurium ions are generally insoluble in water in the mid-pH range.

It is therefore an object of this invention to provide water-soluble tellurium compositions and a method for solubilizing tellurium in the mid-pH range. This object is accomplished by utilizing a cyclodextrin a solubilizing agent. While it is believed that any cyclodextrin can be used, $\alpha$-, $\beta$- and $\gamma$-cyclodextrins are preferred and $\beta$-cyclodextrin is most preferred. The instant dextrin/tellurium compositions and method allow the use of tellurium solutions in the mid-pH range.

The MERCK INDEX, Eleventh Edition, discloses that cyclodextrins act as complex particularly in the study of enzyme action, and that tellurium is a reagent which produces a black finish on silverware.

Co-pending application U.S. Ser. No. 361,087 discloses the use of tellurium-containing compositions to apply tellurium-containing coatings to metal substrates. The use of cyclodextrins as solubilizing agents in such compositions is not disclosed.

These references do not disclose or in any way suggest the instant invention. In fact, no prior art relating to the use of tellurium in combination with cyclodextrins is known to the inventor.

SUMMARY OF THE INVENTION

The instant invention relates generally to a method for solubilizing and/or stabilizing tellurium in aqueous systems by the use of an effective amount of a cyclodextrin compound, and to aqueous compositions characterized by the presence of soluble tellurium and a cyclodextrin.

DETAILED DESCRIPTION OF THE INVENTION

More particularly, the instant invention is directed to a method for solubilizing and/or stabilizing tellurium over a wide pH range comprising adding an effective amount (for the purpose of solubilizing and/or stabilizing tellurium) of a cyclodextrin to water which contains or which will contain a tellurium ion source. In an embodiment believed to be representative of the best mode, a tellurium ion source is added to water at a pH at which tellurium is soluble (e.g., less than about 2.5 or greater than about 11.0). An effective amount of a cyclodextrin is then added to the low or high pH, tellurium-containing solution, and the pH is adjusted to the mid-pH range. Alternatively, the cyclodextrin can be added prior to the tellurium.

Thus, the instant invention is a method for solubilizing tellurium in an aqueous system containing or which will contain a tellurium ion source which comprises adding an effective amount of a cyclodextrin to said aqueous system.

Relative to this method, the term "effective amount" refers to that quantity of a cyclodextrin necessary to solubilize or to maintain the solubility of (i.e., stabilize) the desired concentration of tellurium in a given aqueous system having a given pH.

The present invention is also directed to compositions comprising a) water, b) tellurium or a tellurium ion source; and c) an effective amount of a cyclodextrin for the purpose of solubilizing and/or stabilizing tellurium.

More particularly, the instant compositions comprise: a) water; b) at least about 0.00001% by weight, based on the weight of a) of tellurium, on an active basis, or tellurium ions; and c) an effective amount of a cyclodextrin for the purpose of solubilizing and/or stabilizing said tellurium.

Any source of tellurium ions may be used. Preferred tellurium ion sources are the oxides of tellurium and salts of telluric acid or tellurous acid. The most preferred sources of tellurium ions are tellurium oxide and salts of telluric acid. Such compounds are commercially available from Lewer Corporation.

Any cyclodextrin may be used. Cyclodextrins may be generally defined as $(C_6H_{10}O_5)_x$, wherein x is a minimum of 6. The preferred cyclodextrins are $\alpha$-(x=6) $\beta$-(x=7) and $\gamma$-(x=8) cyclodextrin and the most preferred cyclodextrin is $\beta$-cyclocyclodextrin. Cyclodextrins are commercially available from Amaizo Corporation.

The balance of the instant composition is water, although other compatible compounds may also be present.

The compositions of the present invention preferably contain water, at least about 0.00001%, by weight (based on the weight of the water), tellurium (active basis) or tellurium ions, more preferably about 0.00001% to about 1%, by weight (based on the weight of the water) of active tellurium and at least about 0.00001%, by weight, based on the weight of water, of cyclodextrin, preferably about 0.00001% to about 10%, by weight. The balance of such aqueous compositions comprises any other additives or compounds compatible with the tellurium ions, tellurium ion sources and cyclodextrins, including, for example, chelants, accelerators and other conventional conversion coating additives. Such compositions may be prepared by well known mixing or blending techniques in a mix tank. Agitation is desirable. Order of addition is not believed to be critical.

While it is believed that any amount of a cyclodextrin will solubilize and/or stabilize the tellurium present to some extent, it is also believed that, for substantially complete solubilization to occur, the molar ratio of cyclodextrin: active tellurium (i.e., available tellurium ions) should be at least about 10:1.

Tellurium solubility, absent a cyclodextrin, is pH dependent. Thus, at pH's above about 2.5 and below about 11.0, tellurium is substantially insoluble. The instant invention solubilizes tellurium over the entire pH range. It is believed that this is done by formation of a cyclodextrin/tellurium complex, though the inventor does not wish to be bound by any mechanism.

To demonstrate the solubilizing effect of cyclodextrins on tellurium, an aqueous solution of a tellurium ion source may be prepared at a low (e.g., < about 2.5) or high (> about 11.0) pH. After addition of an effective amount of a cyclodextrin, the pH is adjusted with a suitable acid or base to the mid-pH range. The mid-pH range is defined for purposes of this disclosure as a pH of from about 2.5 to about 11.0, preferably from about 3.0 to about 9.0. Within this range, the cyclodextrins solubilize and/or stabilize the tellurium.

One advantage of solubilizing tellurium in the mid-pH range is to allow the use of tellurium solutions in processes or systems where low pH's and high pH's are impractical or inconvenient. Examples include processes which involve the deposition of tellurium onto a surface, organic synthesis and catalysis.

Chelation and sequestration are well known phenomena. It was initially theorized that any chelant/sequestrant might stabilize and/or solubilize tellurium; examples of some of the more common commercial chelants are EDTA and NTA. However, when these typical chelants were tested, the tellurium was found not to be soluble over the entire mid-pH ranges with these chelants. This led to the testing of a multitude of compounds for their abilities to solubilize tellurium in the mid-pH range. Surprisingly, cyclodextrins were found to solubilize tellurium and/or to maintain tellurium solubility over the entire pH range.

EXAMPLES

The following examples demonstrate the instant compositions and method. These examples are not meant to limit the instant invention in any way.

EXAMPLE 1

An amount equal to 1.6 mmoles of β-cyclodextrin was added to 100 mls of deionized water. One milliliter of a 10,000 ppm solution of tellurium in 20% hydrochloric acid was added to the solution. This is equivalent to 0.08 mmoles of tellurium ions and results in a solution pH of about 1.0. The pH was then adjusted to 4.5 with 1.0N sodium hydroxide. At pH 4.5, tellurium is generally insoluble. However, in the presence of β-cyclodextrin, the solution remained clear when the pH was adjusted. The same tellurium solution minus the β-cyclodextrin formed a precipitate when the pH was adjusted.

EXAMPLE 2

The approximate mole ratio of β-cyclodextrin to tellurium required to produce substantially complete the β-cyclodextrin concentration while maintaining the tellurium concentration. In general, the procedure of Example 1 was used. The point at which a clear solution was produced upon pH adjustment to 4.5 was determined to be the approximate amount of β-cyclodextrin required (in moles) for complete solubilization. The results are shown in Table 1 in terms of molar ratios.

TABLE I

| β-Cyclodextrin/Tellurium Ratio | |
| --- | --- |
| Approximate Molar Ratio β-Cyclodextrin:Te | Appearance |
| 0:1 | Cloudy |
| 1:1 | Slightly cloudy |
| 2:1 | Slightly cloudy |
| 3:1 | Slightly cloudy |

TABLE I-continued

| β-Cyclodextrin/Tellurium Ratio | |
| --- | --- |
| Approximate Molar Ratio β-Cyclodextrin:Te | Appearance |
| 4:1 | Slightly cloudy |
| 5:1 | Slightly cloudy |
| 9:1 | Very slightly cloudy |
| 10:1 | Clear |

The above table indicates that an approximate molar ratio of about 10:1 β-cyclodextrin to tellurium is required for complete initial solubilization at pH 4.5. Further, it is believed that an excess of β-cyclodextrin is required to maintain the tellurium solubility (stabilize the solution) over an extended period of time. It is theorized that this is due to the fact that hydrolysis shifts the equilibrium so as to form a precipitate, which will eventually deplete the tellurium-cyclodextrin complex.

While in these examples β-cyclodextrin is described, it should be noted any cyclodextrin may be utilized, particularly α-, β- and γ-cyclodextrins.

What is claimed is:
1. A composition comprising:
a) water;
b) at least about 0.00001%, by weight, based on the weight of a), of tellurium ions; and
c) an effective amount for the purpose of solubilizing and/or stabilizing tellurium ions of a cyclodextrin; wherein the molar ratio of said cyclodextrin to said tellurium ions is at least 10:1.

2. The composition of claim 1, wherein said composition has a pH ranging from about 2.5 to about 11.0.

3. The composition of claim 2, wherein said cyclodextrin is selected from the group consisting of α-cyclodextrin, β-cyclodextrin and γ-cyclodextrin.

4. The composition of claim 3, wherein said cyclodextrin is β-cyclodextrin.

5. The composition of claim 1, wherein said cyclodextrin is selected from the group consisting of α-cyclodextrin, β-cyclodextrin and γ-cyclodextrin.

6. The composition of claim 5, wherein said cyclodextrin is β-cyclodextrin.

7. A method for solubilizing tellurium which comprises: a) adding at least about 0.00001%, by weight, of tellurium ions to water at a pH at which said tellurium ions are soluble; b) adding an effective amount of a cyclodextrin to said water; and c) adjusting the pH of said water to between about 2.5 and about 11.0.

8. The method of claim 7, wherein said cyclodextrin is selected from the group consisting of α-cyclodextrin, β-cyclodextrin, and γ-cyclodextrin.

9. The method of claim 8, wherein solubilization is substantially complete and wherein the molar ratio of said cyclodextrin to said tellurium ions is at least about 10:1.

10. A composition comprising:
a) water;
b) at least about 0.00001%, by weight, based on the weight of a), of tellurium ions provided by a tellurium ion source selected from the group consisting of oxides of tellurium, telluric acid, tellurous acid, salts of telluric acid and salts of tellurous acid; and
c) an effective amount for the purpose of solubilizing and/or stabilizing said tellurium ions of a cyclodextrin.

* * * * *